(12) United States Patent
Mujawar et al.

(10) Patent No.: US 8,998,559 B2
(45) Date of Patent: Apr. 7, 2015

(54) REDUCED EFFORT MANUAL BOOM LOCK

(75) Inventors: Naushad Maheboob Mujawar, Solapur (IN); Sandeep Dhotre, Kolhapur (IN); Kurtis L. Langner, Dubuque, IA (US); Dennis A. Brimeyer, Dubuque, IA (US)

(73) Assignee: Deere & Company, Moline, IL (US)

( * ) Notice: Subject to any disclaimer, the term of this patent is extended or adjusted under 35 U.S.C. 154(b) by 740 days.

(21) Appl. No.: 13/234,447

(22) Filed: Sep. 16, 2011

(65) Prior Publication Data

US 2013/0071215 A1 Mar. 21, 2013

(51) Int. Cl.
| | |
|---|---|
| *E02F 3/36* | (2006.01) |
| *E02F 3/38* | (2006.01) |
| *E02F 9/18* | (2006.01) |
| *E02F 3/96* | (2006.01) |
| *B25J 19/00* | (2006.01) |

(52) U.S. Cl.
CPC .............. *E02F 3/388* (2013.01); *B25J 19/002* (2013.01); *E02F 9/18* (2013.01); *E02F 3/964* (2013.01)

(58) Field of Classification Search
CPC ........... E02F 3/388; E02F 9/18; B25J 19/002; B25J 18/00
USPC .................. 414/687, 694, 717, 719
See application file for complete search history.

(56) References Cited

U.S. PATENT DOCUMENTS

| | | | |
|---|---|---|---|
| 2,364,121 A * | 12/1944 | Arps ........................... | 414/717 |
| 3,929,239 A * | 12/1975 | Shumaker .................... | 414/694 |
| 4,209,111 A * | 6/1980 | Lotspeich et al. ........... | 221/75 |
| 4,260,321 A | 4/1981 | Beauchamp et al. | |
| 4,348,043 A * | 9/1982 | Fandel ........................ | 294/82.31 |
| 5,064,339 A | 11/1991 | Ahlers | |
| 5,609,261 A * | 3/1997 | Hensler ....................... | 212/292 |
| 5,967,737 A * | 10/1999 | Kraske et al. ................ | 414/694 |
| 6,494,330 B1 * | 12/2002 | Montgon et al. ............. | 212/196 |
| 6,607,347 B2 * | 8/2003 | Burgo .......................... | 414/680 |
| 6,648,582 B2 * | 11/2003 | Mayer et al. ................ | 414/694 |
| 7,475,503 B2 * | 1/2009 | Iannarelli et al. ............ | 37/444 |
| 7,674,084 B2 * | 3/2010 | Lech ............................ | 414/694 |
| 2006/0080930 A1 * | 4/2006 | Brindle ........................ | 52/655.1 |
| 2006/0245895 A1 * | 11/2006 | Horst et al. .................. | 414/680 |

* cited by examiner

*Primary Examiner* — Scott Lowe
(74) *Attorney, Agent, or Firm* — Taft Stettinius & Hollister, LLP; Stephen F. Rost (57) ABSTRACT

The present disclosure provides a backhoe boom lock for engaging a hook member of a boom in a transport position. The boom lock includes a pair of side members disposed parallel to one another along a substantially horizontal axis, each side member having a first end and a second end. A transverse member is coupled between the first end of the pair of side members, the transverse member is configured to engage the hook member in the transport position. The boom lock further includes a pivot point defined near the second end of the pair of side members, the pair of side members being pivotally coupled with respect to the pivot point such that the boom lock pivots about the pivot point. A flange is disposed between the second ends of the pair of side members and is further disposed outwardly from the pivot point at an angle with respect to the horizontal axis. The boom lock also includes a counterweight body integrally coupled to the second ends of the pair of side members.

18 Claims, 9 Drawing Sheets

REDUCED EFFORT MANUAL BOOM LOCK

FIELD OF THE INVENTION

The present invention relates to a backhoe boom lock for locking a boom to a swing frame during transporting and craning operations, and in particular to a manual boom lock with reduced force required to manipulate the boom lock.

BACKGROUND OF THE INVENTION

Work vehicles can be equipped with backhoes for doing excavation work. A backhoe is provided with a pivotal boom which is attached to the vehicle by a swing frame. The swing frame is provided with a vertical pivot for pivoting the backhoe about a vertical axis relative to the vehicle. The boom of the backhoe is joined to the swing frame by a horizontal pivot and can be pivoted relative to the swing frame about a horizontal axis. A dipperstick is pivotally coupled to the boom. The positions of the swing frame relative to the vehicle, the boom relative to the swing frame, and the dipperstick relative to the boom are controlled by hydraulic cylinders. Typically, a bucket is pivotally attached to the end of the dipperstick remote from the boom. A hydraulic cylinder pivotally attached to the dipperstick is used to position the bucket relative to the dipperstick through a bucket linkage.

When a work vehicle equipped with a backhoe is travelling between work sites, the boom is locked to the swing frame in a transport position. In this position, the swing frame is also locked relative to the work vehicle. A boom lock is used for locking the boom to the swing frame. Various examples of a boom lock are disclosed in U.S. Pat. Nos. 4,260,321, 5,064,339, and 5,967,737.

Figure 1:
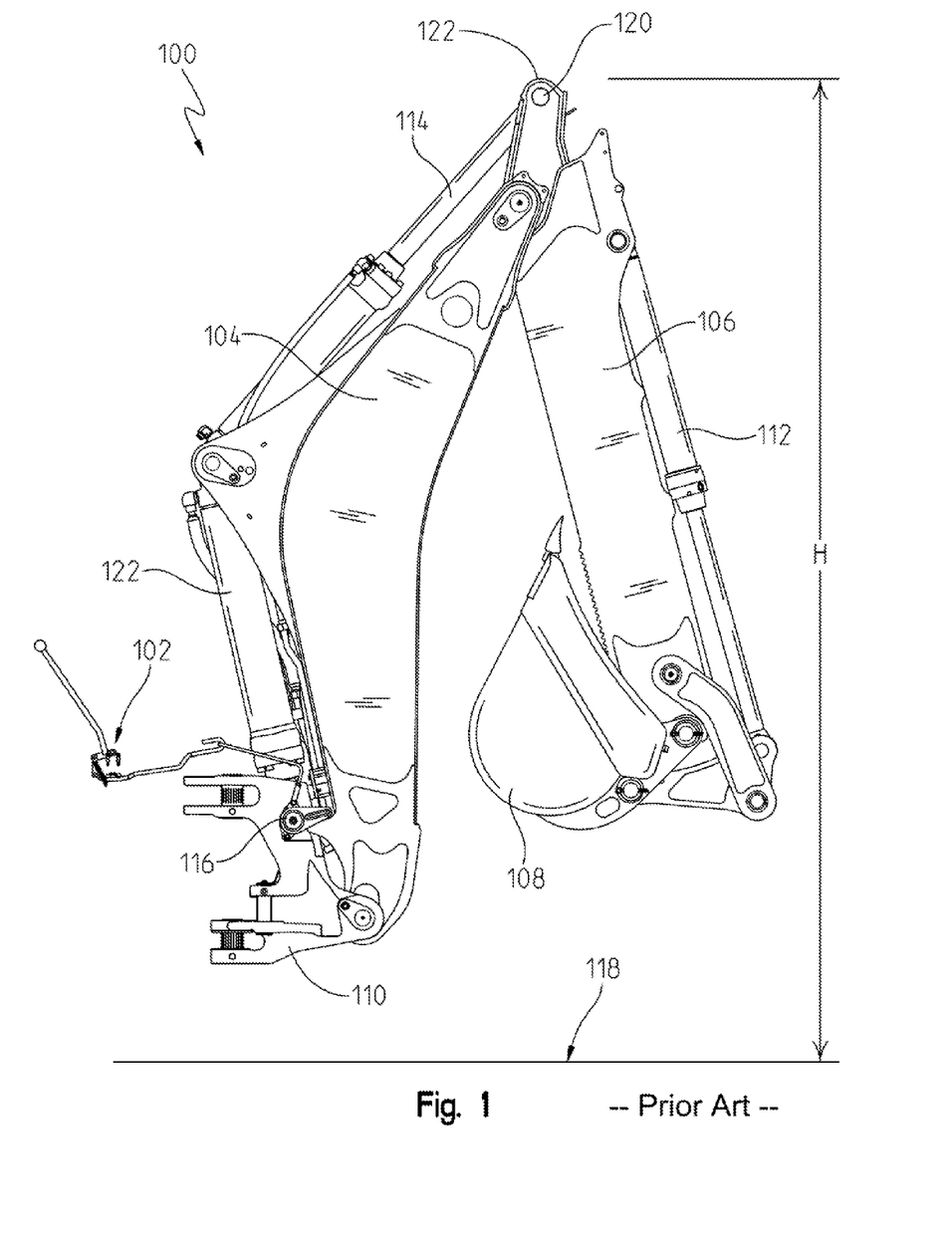
FIG. 1 is a side view of a conventional boom, dipper, swing frame, and control linkage.

Referring to FIG. 1, a portion of a conventional backhoe 100 is shown in which a conventional boom 104 is locked to a swing frame 110 by a conventional boom lock 116 in the transport position. As shown, a dipper 106 is coupled at one end to a bucket 108 and at the opposite end to the boom 104. In an operational mode, the boom 104, dipper 106, and bucket 108 can be manually controlled by a control system 102. The bucket 108, in particular, can be controlled by a hydraulic cylinder 112 and the dipper 106 can be controlled by a different hydraulic cylinder 114. In the transport position, the backhoe 100 is positioned on a ground surface 118. The dipper 106 and hydraulic cylinder 114 are connected at a horizontal coupling point 120. At an uppermost point 122 of the backhoe, which is above the horizontal pivot point 120, a transport height H can be defined between this uppermost point 122 and a ground surface 118 upon which the vehicle moves. The transport height H can vary for different backhoes, but the height for many conventional backhoes is greater than 4.0 meters. However, at least in some countries, new regulations require backhoes to have a transport height H less than 4.0 meters. In addition, the operator has to apply a significant force (over 113 N) to manipulate the conventional boom lock to engage and disengage the boom 104. For some operators, it can be difficult to engage and disengage the boom 104 for operation.

A need therefore exists to provide a backhoe having a boom and dipper configuration which has a transport height less than four meters. It is further desirable to reduce the transport height without changing the design of the boom or dipper. It is also desirable to reduce the force required by the operator to engage and disengage the boom lock and boom.

SUMMARY

In an exemplary embodiment of the present disclosure, a backhoe boom lock is provided for engaging a hook member of a boom in a transport position. The boom lock includes a pair of side members disposed parallel to one another along a substantially horizontal axis, each side member having a first end and a second end. A transverse member is coupled between the first end of the pair of side members, the transverse member is configured to engage the hook member in the transport position. The boom lock further includes a pivot point defined near the second end of the pair of side members, the pair of side members being pivotally coupled with respect to the pivot point such that the boom lock pivots about the pivot point. A flange is disposed between the second ends of the pair of side members and is further disposed outwardly from the pivot point at an angle with respect to the horizontal axis. The boom lock also includes a counterweight body integrally coupled to the second ends of the pair of side members. The counterweight body can include an elongated portion and a curved edge such that the elongated portion is integrally coupled to the second end of each side member.

In another embodiment, a vehicle is provided for moving along a ground surface. The work vehicle includes a frame, a cab coupled to the frame, a backhoe, and a swing frame pivotally mounting the backhoe on the frame about a vertical pivot. The backhoe has a boom rotatably mounted on the swing frame about a horizontal pivot for movement between a transport position and selected working positions, and a hydraulic cylinder operative between the boom and the swing frame for positioning the boom. The vehicle further includes a locking system for selectively locking the boom to the swing frame to prevent the boom from rotating about the horizontal pivot in the transport position. The locking system comprises an upwardly extending hook mounted on the boom, a control lever disposed in the cab, a linkage assembly operably coupled to the control lever, wherein movement of the control lever actuates the linkage assembly, and a boom lock pivotally mounted on the swing frame about a pivot axis. The boom lock includes a pair of elongated side members, a flange extending outwardly from the pivot axis and coupling to the linkage assembly, and a transverse member disposed between the pair of side members such that actuation of the linkage assembly lifts the transverse member to engage the upwardly extending hook in the transport position. In the transport position, the transport height is less than four meters.

In one aspect of this embodiment, a counterweight body is integrally coupled to the boom lock. The counterweight body is disposed at one end of the boom lock and the transverse member is disposed at a substantially opposite end thereof. In another aspect thereof, a spring is disposed between the cab and linkage assembly for biasing the boom lock downwardly. In a further aspect, a rubber body is coupled to the boom and is configured to contact the swing frame in the transport position.

In a different aspect, a spacer is coupled to the swing frame and aligned to contact the rubber body in the transport position, the spacer having a defined thickness to permit the engagement of the transverse member and upwardly extending hook. The spacer can be removably or fixedly coupled to the swing frame. In this aspect, the boom lock can further include a counterweight body integrally formed at one end thereof. In an alternative aspect, the boom lock can have a repositioned flange that is disposed with respect to a horizontal axis at an angle less than 60°. In this aspect, the boom lock does not include a counterweight body and the spacer is fixedly coupled to the swing frame.

In this embodiment, the vehicle can further include a pivot rod disposed along the pivot axis such that the boom lock is pivotally mounted to the swing frame about the pivot rod.

In a different embodiment, a work vehicle is capable of moving along a surface for performing an operation. The vehicle includes a frame; an operator's cab mounted to the frame; a swing frame pivotally mounted to the frame about a vertical pivot; a backhoe having a boom and a hydraulic cylinder, the boom being rotatably mounted on the swing frame about a horizontal pivot for movement between a transport position and selected working positions, and the hydraulic cylinder being operative between the boom and the swing frame for positioning the boom, and a locking system for selectively locking the boom to the swing frame to prevent the boom from rotating about the horizontal pivot in the transport position. The locking system includes an open hook mounted on the boom; a control lever disposed in the cab; a linkage assembly operably coupled to the control lever; a spring assembly coupled at one end to the operator's cab and at an opposite end to the linkage assembly; and a boom lock pivotally mounted on the swing frame about a pivot axis. The boom lock includes a pair of elongated side members, a flange extending outwardly from the pivot axis and coupling to the linkage assembly, and a transverse member disposed between the pair of side members such that actuation of the control lever lifts the transverse member to engage the open hook in the transport position. The boom is configured to move between selected working positions and the transport position such that in the selected working positions the spring biases the transverse member downwardly. In addition, in the transport position, the transport height (e.g., distance between uppermost point of the backhoe and ground surface) is less than four meters.

In one aspect, the boom lock includes a counterweight body integrally coupled to the boom lock. In this aspect, the vehicle can include a spacer removably coupled to the swing frame; and a rubber body coupled to the boom such that in the transport position, the spacer and rubber body are in contact with one another. The counterweight body is disposed at one end of the boom lock and the transverse member is disposed at a substantially opposite end thereof.

In a different aspect, a spacer is fixedly coupled to the swing frame; and a rubber body is coupled to the boom such that in the transport position the spacer and rubber body are in contact with one another. The spacer has a thickness which defines a space between the swing frame and boom through which the transverse member can move to engage with the open hook. In this aspect, the pair of elongated side members are disposed parallel to one another along a horizontal axis, the horizontal axis being planar but perpendicular to the pivot axis; and the flange is angularly disposed with respect to the horizontal axis at less than 60°.

An advantage of the above-described embodiments and those that will be described below is the reduction in transport height. With the elongated boom lock, the boom does not have to rotate as far in a counterclockwise direction and thus the transport height is reduced to below 4 meters.

Another advantage of the embodiments of the present disclosure is the reduced force required to engage the boom and boom locks. Due to the boom lock having elongated side members, i.e., having a length greater than conventional boom locks of at least 85 mm, the center of gravity of the boom lock shifts away from the pivot axis. The counterweight portion of the boom lock, however, rebalances or adjusts the center of gravity to reduce the requisite force to control the boom lock movement. In those embodiments in which the counterweight portion is not provided, the position of the flange can be adjusted in a clockwise direction. The repositioned flange can further reduce the requisite force for controlling the movement of the boom lock.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 2:
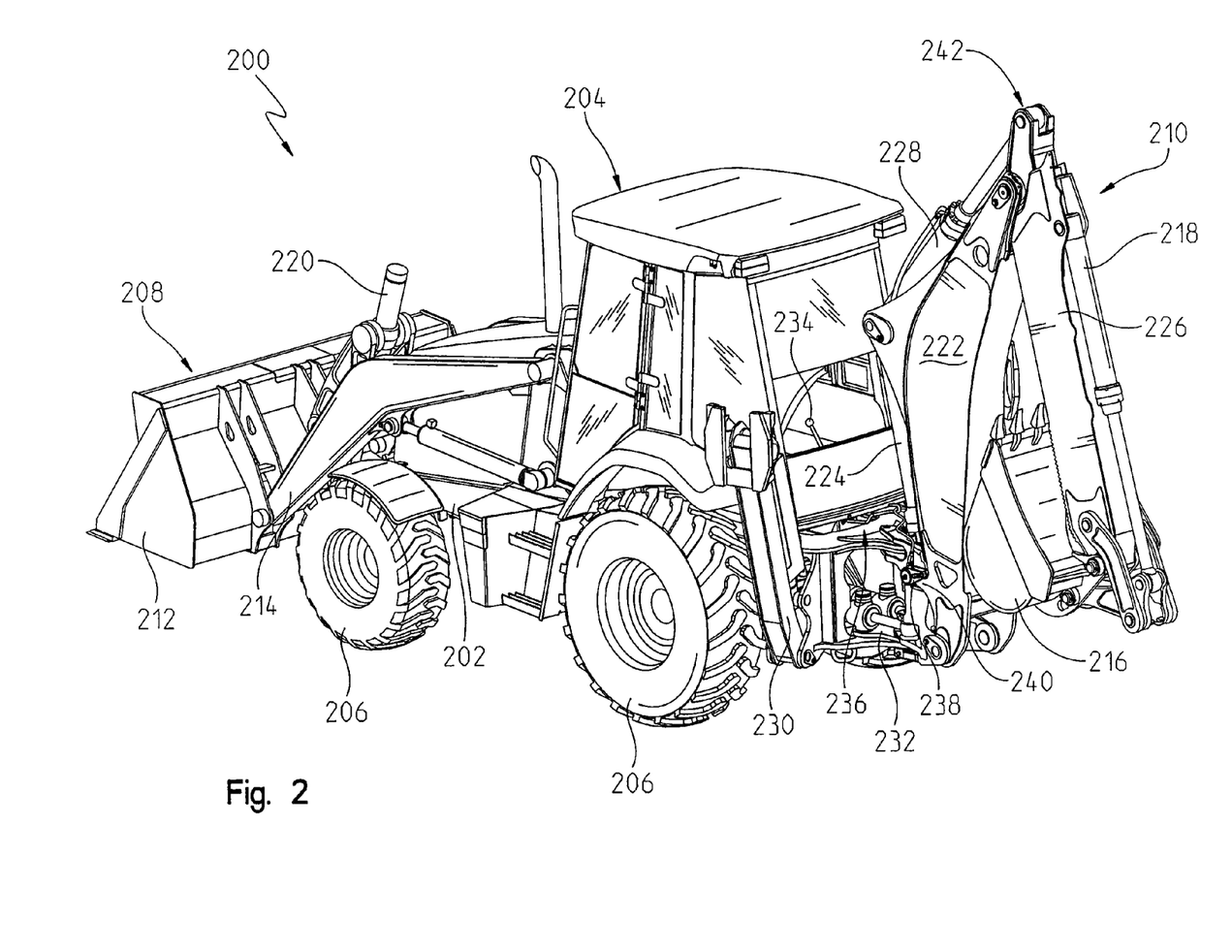
FIG. 2 is a rear perspective view of a backhoe loader.

With reference to FIG. 2 of the present disclosure, a work vehicle such as a backhoe loader 200 is shown. The vehicle 200 includes a frame 202 to which are mounted ground engaging wheels 206 for supporting and propelling the frame 202. Although the present disclosure illustrates a backhoe loader 200, it is not limited to such and may include a crawler work vehicle or other suitable work vehicles. The backhoe loader 200 is provided with a loader 208 which includes a loader bucket 212, a loader bucket lift arm 214, a loader bucket actuating hydraulic cylinder 220, and a suitable loader bucket linkage for manipulating the loader bucket 212 relative to the frame 202. The backhoe further includes an uppermost point 242 for defining the transport height (e.g., the distance between the uppermost point 242 and ground).

The rear of the vehicle frame 202 is provided with a swing frame 232. The vehicle 200 includes a backhoe 210 which includes a boom 222 pivotally coupled to the swing frame 232 and a dipper 226 pivotally coupled to the boom 222. A backhoe bucket 216 is pivotally coupled to the dipper 226 and is manipulated by a backhoe bucket hydraulic cylinder 220. A boom actuating hydraulic cylinder 224 manipulates the boom 222 and a dipper hydraulic cylinder 228 manipulates the dipper 226 during operation. In addition, the backhoe loader 200 is also provided with two stabilizers 230. The operation of the vehicle 200 is controlled from an operator's cab 204 and includes a control lever 234 and control linkages 236.

In the illustrated embodiment, the boom 222 is provided with a pair of hooks or catches 240 disposed upwardly and which overlap the swing frame 232 when the boom 222 is retracted into its craning or transport position. A boom lock 238 is coupled on the left and right sidewalls of the swing frame 232. In the craning or transport position, the boom lock 238 engages the upwardly disposed hooks 240 of the boom 222 to support and maintain the boom 222 in this position. As will be described, the boom lock 238 can engage and disengage from the hooks 240 by manipulating the control lever 234 and control linkages 236 from the cab 204 of the vehicle 200.

Figure 3:
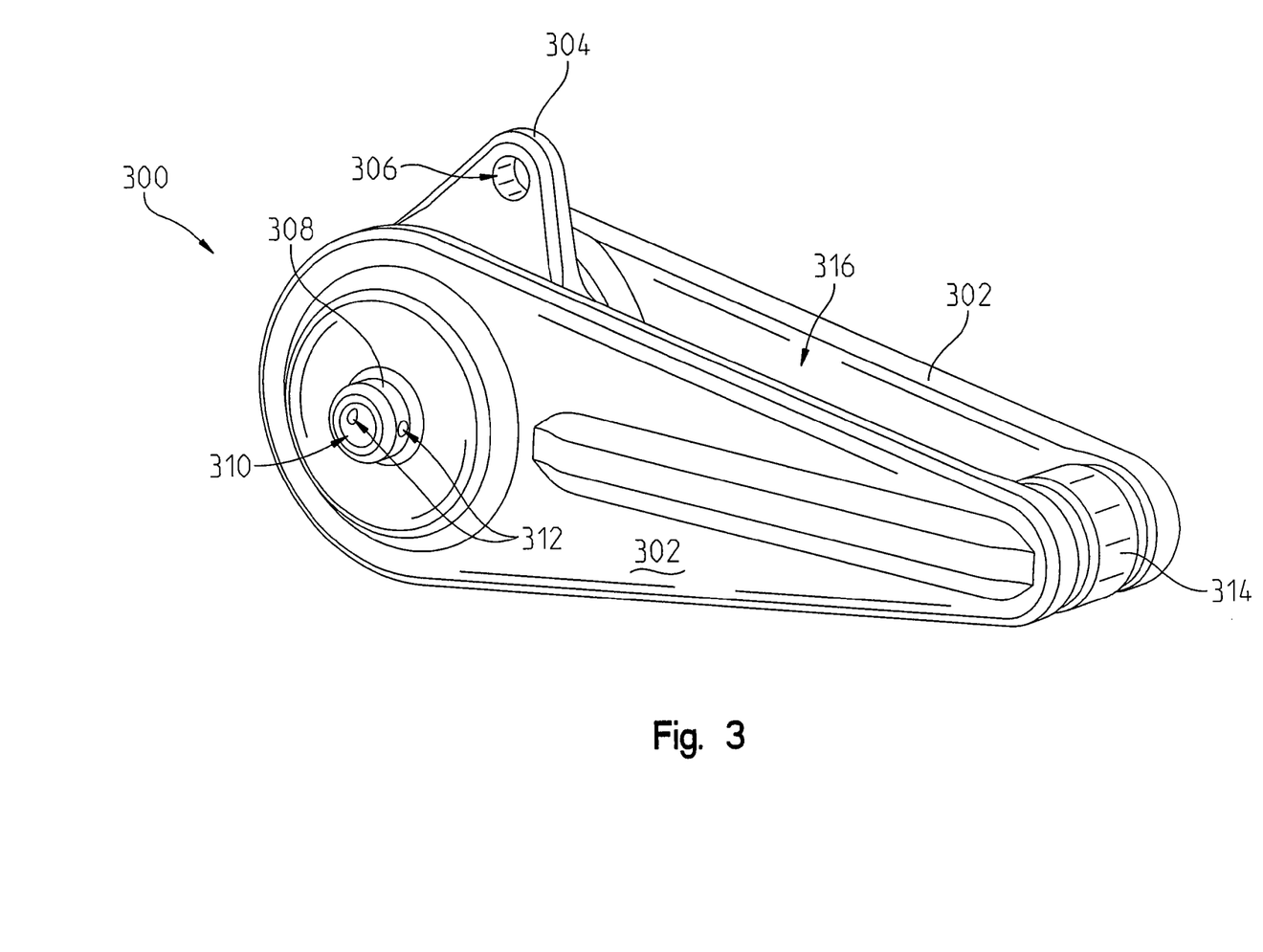
FIG. 3 is a perspective view of an elongated boom lock.

Referring to FIG. 3, an exemplary embodiment of a boom lock 300 is shown. The boom lock 300 has an elongated body formed by a pair of side members 302. The pair of side members 302 have one end having a diameter greater than at the opposite end thereof. The pair of side members 302 are spaced from one another and the space therebetween defines a catch opening 316 through which the boom hook 240 latches (FIG. 2). The catch opening 316 is defined by a transverse member 314 at the end nearest the smaller diameter of the pair of side members 302. The boom hook 240 can latch or couple to the transverse member 314 in the transport position. When the boom is not in the transport position, the transverse member 314 is free from being coupled to any other device.

Near the end opposite the transverse member 314, the boom lock 300 includes a flange 304 protruding outwardly therefrom. The flange 304 has an arch-like shape and is disposed intermediate the pair of side members 302. The flange 304 can define an opening 306 for coupling to the control linkage of the vehicle (e.g., see FIGS. 5-7). When an operator of a work vehicle wants to manipulate the boom into the transport position, the control linkage can be actuated to control the boom lock 300 via the flange 304 for engaging the boom hook.

The boom lock 300 can also be coupled to the swing frame of the work vehicle. In the present disclosure, there can be two or more boom locks which are pivotally coupled to a pivot rod (e.g., pivot rod 512 in FIG. 5). The pivot rod passes through a central opening 310 defined in the boom lock 300, and a pivot axis is defined through this opening 310. Each of the side members 302 can include a collar 308 that extends outwardly from the side member 302. The collar 308 can include key slots 312 through which a key or fastener (not shown) can fasten or couple the boom lock 300 to the pivot rod.

In order to reduce the transport height of the boom during transport, the exemplary boom lock 300 has elongated side members 302 so that the overall length of the boom lock is greater than conventional boom locks. The boom lock 300 of FIG. 3 has an increased length of about 85 mm with respect to conventional boom locks. The increased length is advantageous because the boom does not have to be rotated in a counter-clockwise direction as far to reach the transport position because the elongated boom lock 300 extends further towards the boom. As shown in FIG. 1, the boom 104 rotates in a counter-clockwise direction so it engages with the conventional boom lock 116 in the transport position. By not rotating as far in the counter-clockwise direction due to the elongated side members 302, the transverse member 314 can engage the boom at a reduced transport height. In one embodiment, the transport height can be reduced by approximately 140 millimeters. In another embodiment, the transport height can be reduced to less than 4 meters. For example, in a non-limiting embodiment, the boom height can be reduced to about 3.97 meters.

Figure 4:
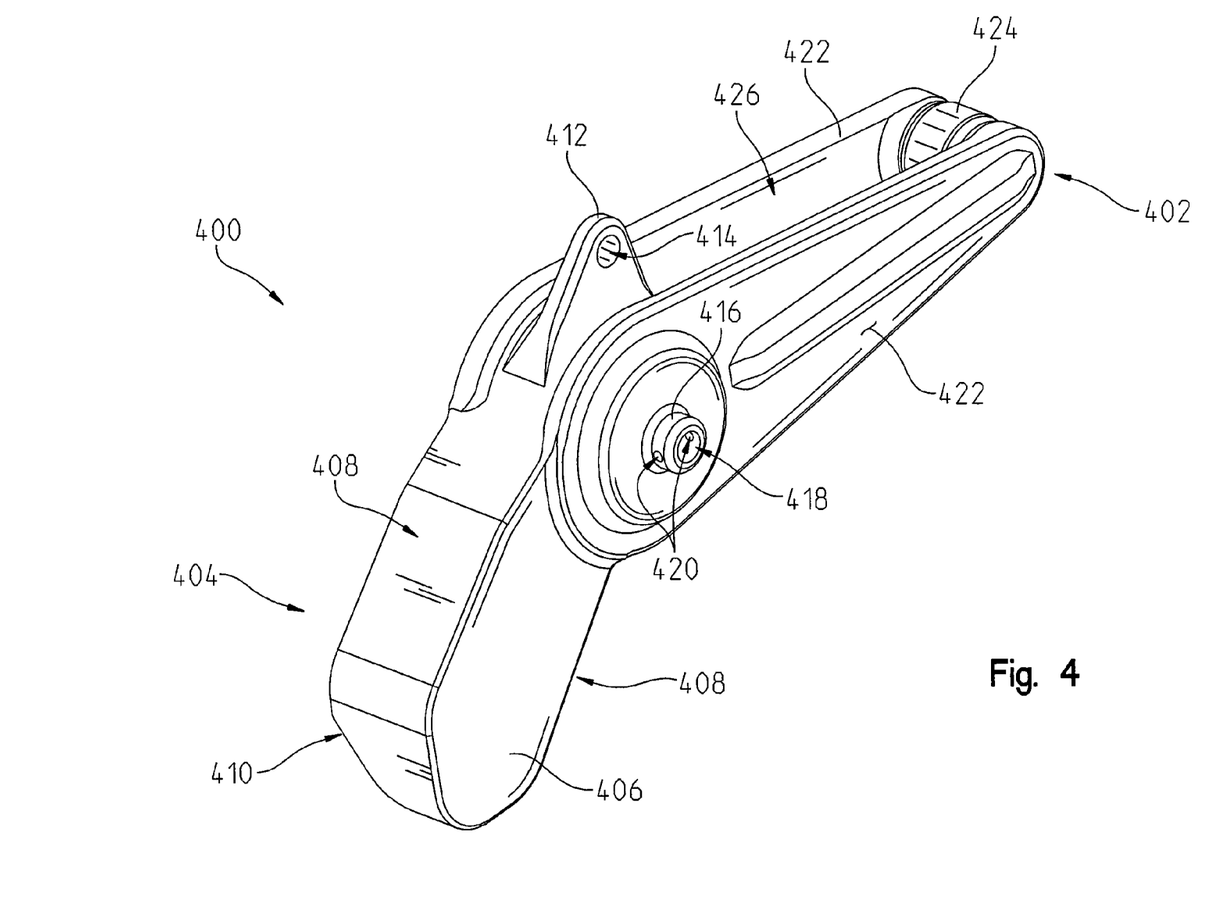
FIG. 4 is a perspective view of an elongated boom lock having an integral counterweight

In FIG. 4, a different embodiment of a boom lock 400 is shown. The boom lock 400 performs similarly to the boom lock 300 of FIG. 3. For example, the boom lock 400 includes a coupler portion 402 formed by a pair of side members 422 and a transverse member 424. In the transport position, the transverse member 424 can engage a boom hook for coupling the boom and boom lock 400 together. The pair of side members 422 are spaced from one another and define a hook or catch opening 426 for coupling to the boom hook.

The boom lock 400 also includes a flange 412 protruding outwardly and forming an arch-like configuration. The flange 412 further defines an opening 414 to which a link of a control linkage (not shown) can be coupled. The boom lock 400 can include a collar 416 extending outwardly from each side member 422. The collar 416 defines an opening 418 through which a pivot rod (not shown) is coupled. This opening defines the pivot axis. The collar 416 can further define key slots or openings 420 for coupling the boom lock 400 to the pivot rod.

Unlike the elongated boom lock 300 shown in FIG. 3, the boom lock 400 also includes a counterweight portion 404 in addition to the coupler portion 402. The counterweight portion 404 includes a body 406 integrally formed with the coupler portion 402. The body 406 is formed at an opposite end of the boom lock 400 from the transverse member 424. The body includes an elongated portion 408 and a curved portion 410, as shown.

The counterweight portion 404 can add up to an additional 4 kg to the boom lock 400. The elongated boom lock 300 previously described can have a mass of about 6 kg, whereas conventional boom locks can have a mass less than 5 kg. Thus, the boom lock 400 of FIG. 4 can have twice the mass of a conventional boom lock, but advantageously reduces the transport height due to its elongated side members 422 when coupled to the boom.

Another advantage of the counterweight portion 404 of the boom lock 400 is the redistribution of weight about the pivot axis. In the boom lock 300 of FIG. 3, the elongated side members 302 shift the center of gravity of the boom lock 300 away from its pivot axis. As a result, the force required to control the boom lock becomes greater as the center of gravity shifts from the pivot axis. The counterweight portion 404, however, of the boom lock 400 redistributes or shifts the center of gravity back towards the pivot axis. Thus, the force required to control the boom lock 400 can be reduced. As will be described below, the force required to manipulate the boom lock is exerted by a vehicle operator on the lever in the cab.

In one exemplary embodiment, the force required to manipulate the boom lock 400 is less than the force to manipulate a conventional boom lock. As previously described, the force to manipulate a conventional boom lock exceeds 113 N whereas the force to manipulate the boom lock 400 of FIG. 4 is less than 110 N, and preferably about 106 N or less. The elongated boom lock 300 of FIG. 3 can require 160 N or more of force to be manipulated due to the redistributed center of gravity. As will be further described, the flange 304 can be repositioned (see FIG. 8) so that the force required to manipulate the boom lock 300 is less than 113 N, and preferably about 111 N or less. Thus, the elongated boom lock, with or without the counterweight portion, can be easier to manipulate and requires less force or effort to lock a boom compared to conventional boom locks.

Figure 9:
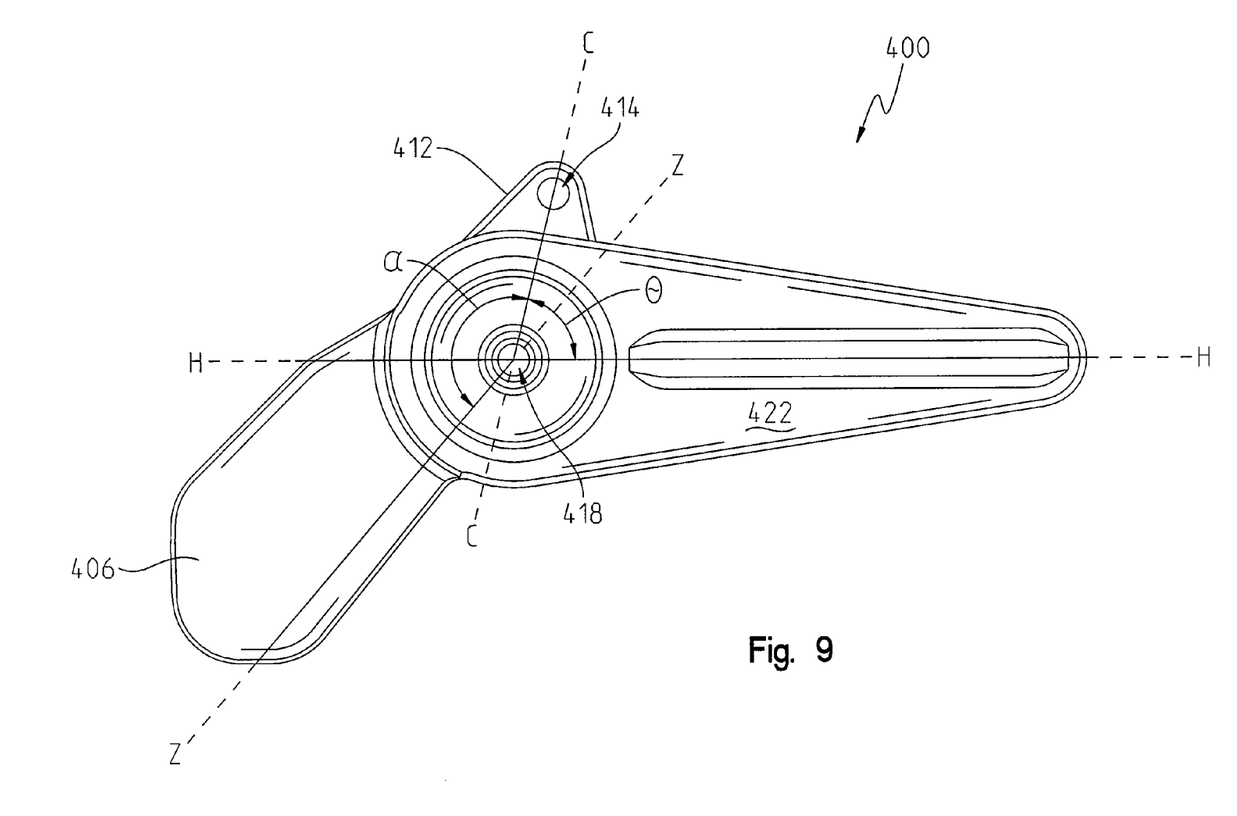
FIG. 9 is a side view of the boom lock of FIG. 4.

In FIG. 9, the boom lock 400 is shown with respect to various angles and axes. In particular, a horizontal axis H-H is shown being planar but perpendicular to the pivot axis. The horizontal axis H-H is disposed parallel to the length of each side member 422. Although not shown, the transverse member of the boom lock 400 is disposed substantially perpendicularly with respect to the horizontal axis H-H. A second axis, C-C, passes through the center points of the pivot opening 418 and flange opening 414. In one aspect, the angular relationship, θ, of the flange 412 with respect to horizontal axis H-H is greater than 70°. In another aspect, the angular relationship θ is 75° or greater. In one non-limiting aspect, θ is approximately 76°.

A third axis, Z-Z, passes through the center point of the pivot opening 418 and defines an angular relationship, α, with respect to the position of the counterweight body 406 relative to the flange 412. The angle α is defined as the angular relationship between axis C-C and axis Z-Z, as shown in FIG. 9. In one aspect, the angular position α of the counterweight body 406 with respect to the flange 412 is between 90-180°. In another aspect, the angle α is between 100-150°. In a non-limiting aspect, the angle α is approximately 149°.

Figure 5:
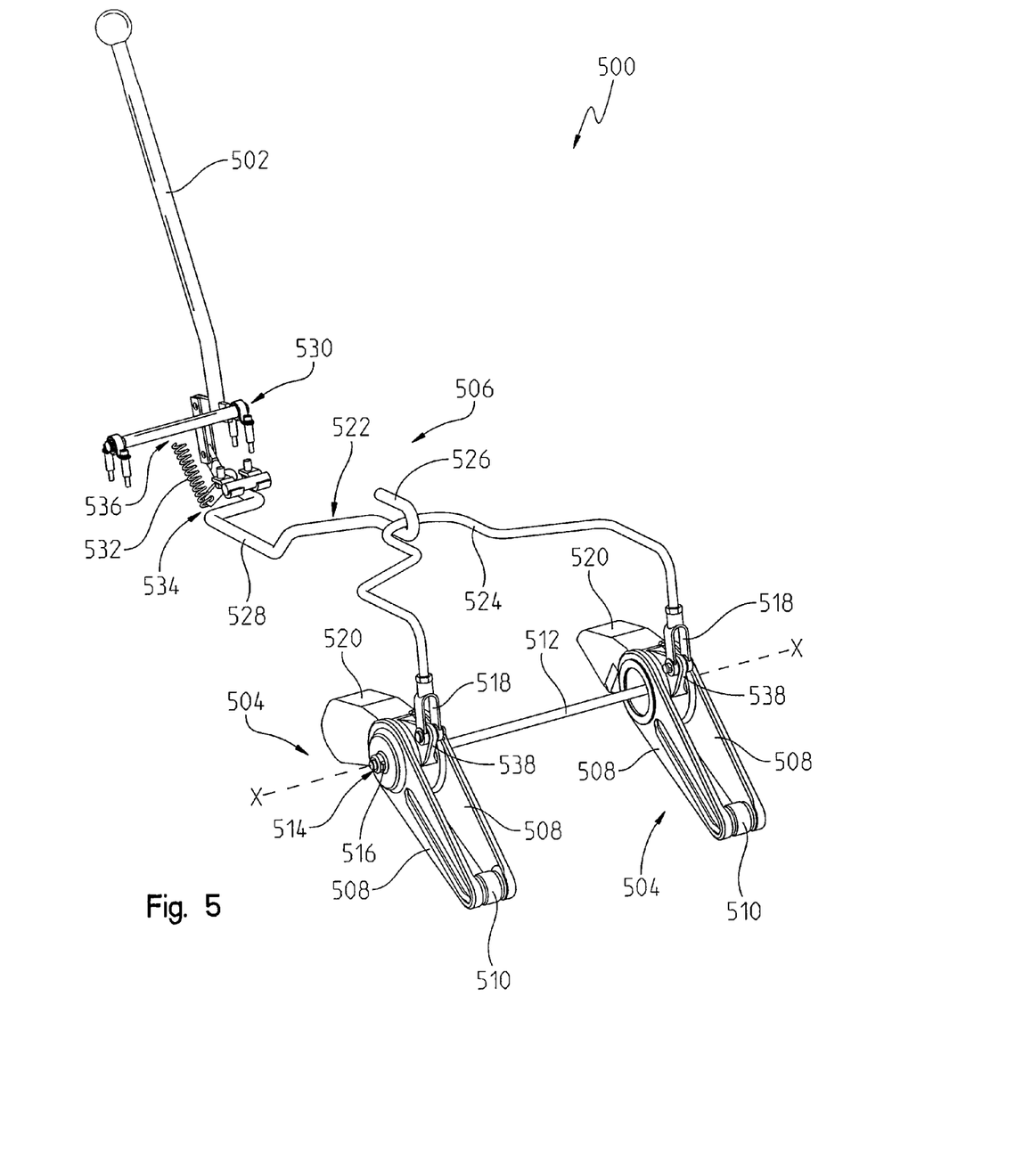
FIG. 5 is a perspective view of elongated boom locks having integral counterweights and a control linkage.
Figure 6:
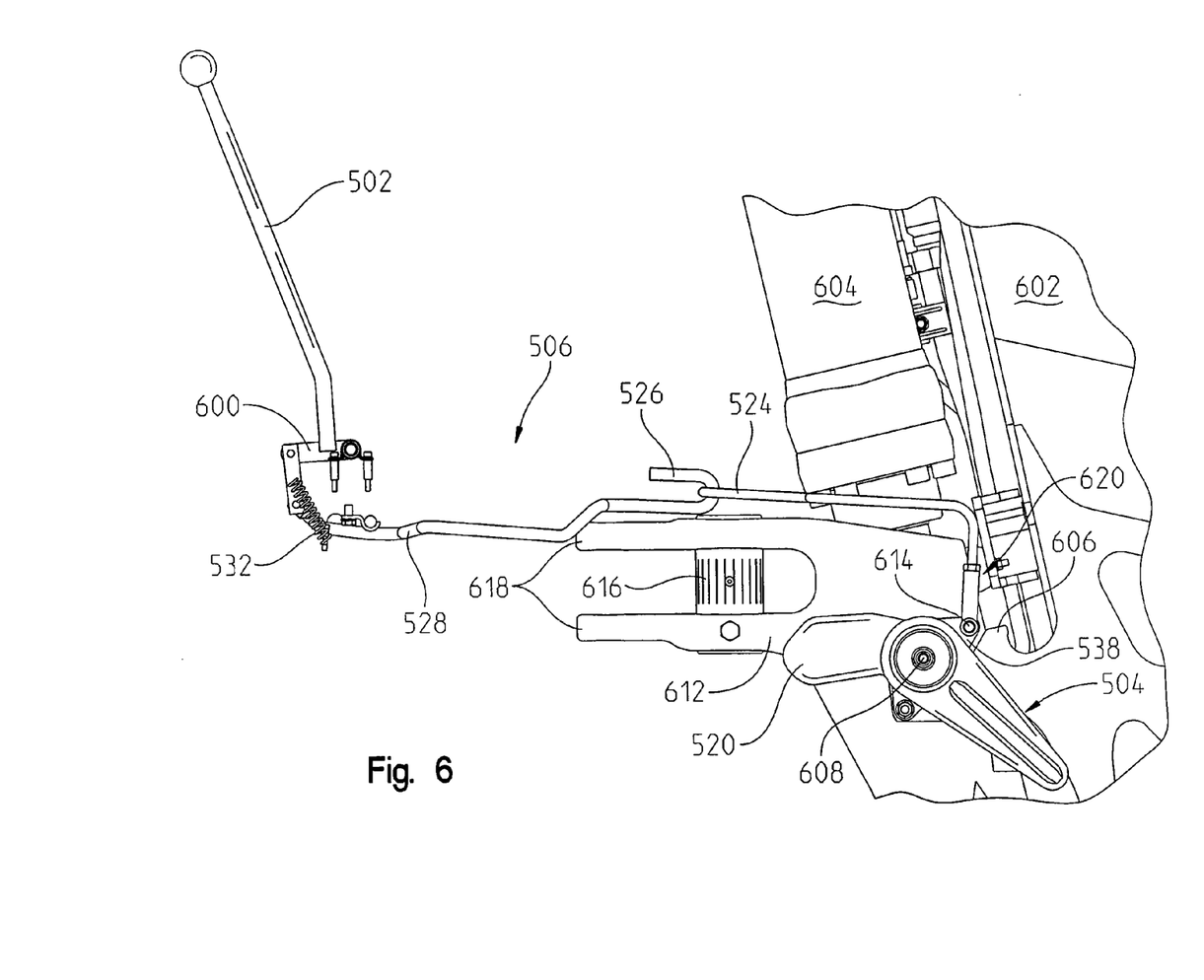
FIG. 6 is a side view of an exemplary elongated boom lock, a boom, a swing frame, and a control linkage.

Referring to FIGS. 5 and 6, a boom lock control assembly 500 is shown. The control assembly 500 is shown with a pair of boom locks 504 each having a counterweight body 520, of which is similar to the elongated boom lock 400 of FIG. 4. Each boom lock 504 includes a pair of side members 508 and a transverse, catch member 510 for engaging a boom 602. The pair of side members 508 are aligned substantially parallel to one another. The boom lock 504 also includes a flange 538 extending therefrom and which defines an opening (not shown) for coupling to the remainder of the control assembly 500.

Each boom lock 504 includes a collar coupler 514 through which a pivot rod 512 extends and couples thereto. The pivot rod 512 is disposed along axis X-X, which is substantially perpendicular to the side members 508 of the boom lock 504. As the boom locks 504 are actuated, the boom locks 504 are able to pivot about the pivot rod 512. The pivot rod 512 can be coupled to the swing frame 612 such that the boom locks 504 pivot relative to the swing frame 612. The pivot rod 512 can be securely coupled to each boom lock 504 via a key or pin 516 that inserts into a key slot defined in the collar coupler 514.

The boom lock control assembly 500 further includes a linkage assembly 506. The linkage assembly 506 is disposed between a control lever 502 and the boom locks 504. As previously described, the control lever 502 is provided in the cab of the work vehicle so that a vehicle operator can control the boom locks 504 from the cab.

The linkage assembly 506 includes a control link portion 522 having a generally U-shaped link 524 that is pivotally coupled to both of the boom locks 504 by pivot collars or yokes 518. The U-shaped link 524 can couple to a hooked portion 526 of a boom lock control link 528. The boom lock control link 528 is coupled to a straight link 600 that is coupled to a crank portion 530 of the linkage assembly 506. Therefore, the linkage assembly 506 comprises the control link portion 522 and crank portion 530, as shown in FIGS. 5-6. The crank portion 530 can include a spring assembly 532 which is coupled at one end 534 to the boom lock control link 528 and at an opposite end to the cab of the vehicle. The spring assembly 532 is configured to bias the boom locks 504 downwardly and in a position in which a force exceeding the spring resistance is required to rotate the transverse members 510 upwardly for engaging the upwardly extending hooks 606 of the boom 602. The crank portion 530 of the linkage assembly 506 is coupled to the control lever 502 such that a force applied to the control lever 502 can actuate the linkage assembly 506 and boom locks 504 so long as the force exceeds the corresponding spring force.

To actuate the boom locks 504, a vehicle operator moves the control lever 502 in a direction opposite the boom 602 so that the crank portion 530 pushes the straight link 600 downwardly thereby rotating the boom lock control link 528 and lifting the hooked portion 526. As the hooked portion 526 begins to move upward, the U-shaped link 524 also moves upward. As the U-shaped link 524 begins to lift upward, the boom locks 504 rotate upwardly as well. The boom 602 can then be moved into its craning or transport position by actuating a boom hydraulic cylinder 604 so as the boom locks 504 are released the transverse members 510 engage upwardly disposed hooks 606 of the boom 602 and lock the boom 602 relative to the swing frame 618.

As further shown in FIG. 6, each boom lock 504 includes a flange 538. The flange 538 includes a defined opening (not shown) for coupling to the linkage assembly 506. For example, a pin or other link 614 can couple the flange 538 to the pivot collar 518. As the U-shaped link 524 moves upward, the pivot collar 518 and pin 614 also move upward causing the boom lock 504 to rotate about the pivot rod 512.

As described above, the swing frame 612 can be coupled to the frame of the work vehicle. To do so, the swing frame 612 is pivotally coupled to the frame 202 (FIG. 2) by means of a vertical pivot pin 616. The vertical pivot pin 616 defines a substantially vertical axis about which the swing frame 612 pivots relative to the vehicle frame 202. A hydraulic cylinder (not shown) can be provided to pivotally actuate the swing frame 202 relative to the vehicle frame 202. In FIG. 6, the swing frame 612 can include two forwardly projecting portions 618, each of which defines a vertical aperture through which the vertical pivot pin 616 is coupled. Although not shown, the vehicle frame 202 includes a rearwardly extending portion which defines a vertical aperture (not shown). The vertical apertures of the forwardly projecting portions 618 of the swing frame and the vertical aperture of the rearwardly extending portion (not shown) of the vehicle frame 202 can be aligned so that the vertical pivot pin 616 pivotally couples both frames to one another.

The boom 602 can also include a rubber body 620 that can engage or contact the swing frame 612 in the transport position. The rubber body 620 can be formed of a rubber elastomer, elastic, plastic, deformable, or other soft material. The rubber body 620 can be coupled to the boom 602 by an adhesive, a fastener, weld, or any other means known to the skilled artisan. Although only one rubber body 620 is shown in FIG. 6, there can be two or more rubber bodies 620 coupled to the boom 602.

Figure 7:
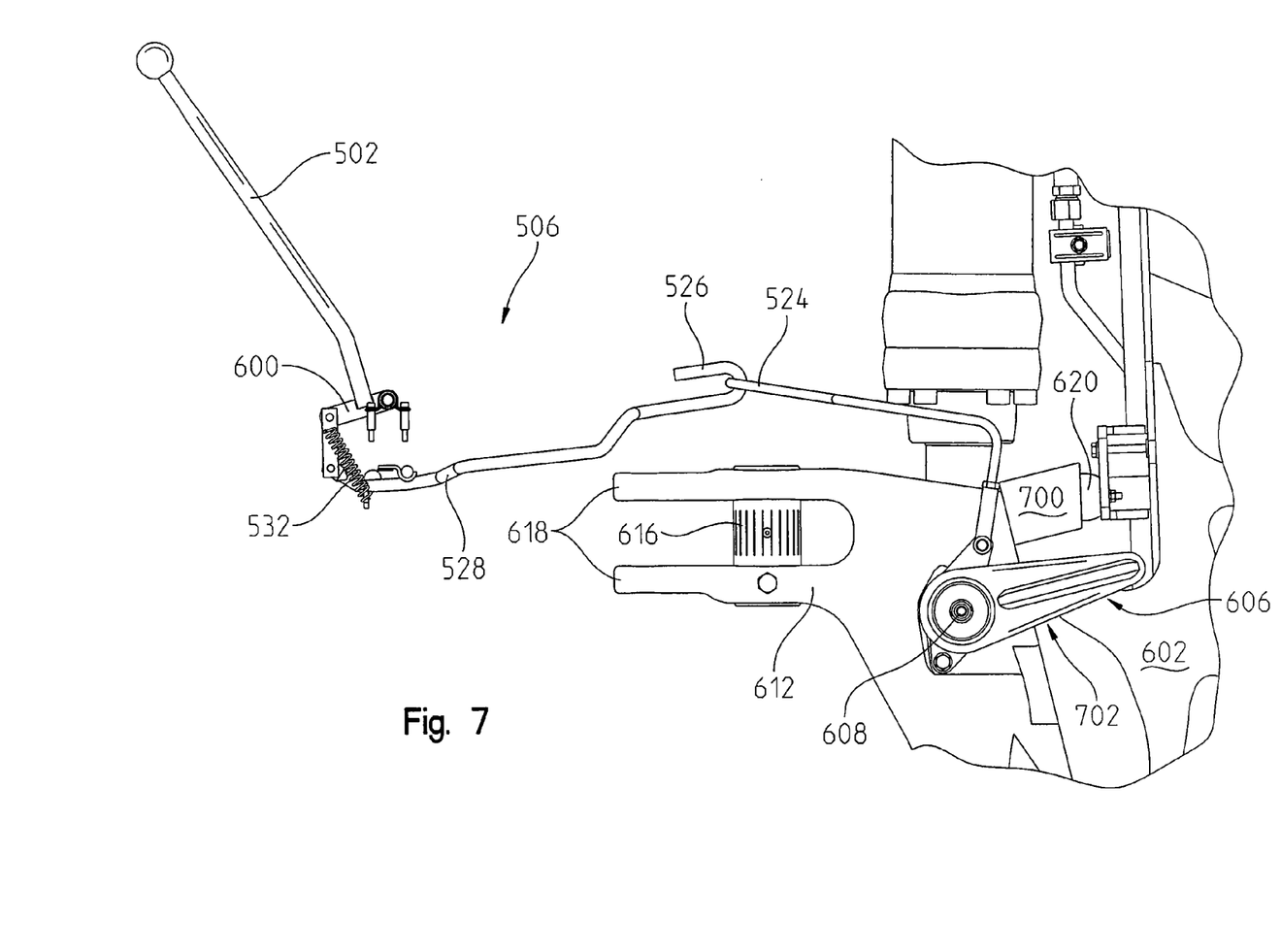
FIG. 7 is a side view of another exemplary elongated boom lock, a boom, a swing frame, and a control linkage.

Referring to FIG. 7, an exemplary embodiment of an elongated boom lock 702 is shown coupled to a boom 600 in the transport position. In this embodiment, the spring assembly 532 is part of the linkage assembly, as shown. In alternative embodiments, a similar spring assembly can instead be positioned between each boom lock and the linkage assembly 506.

A spacer 700 is shown coupled to the swing frame 612 and in contact with the rubber body 620 of the boom 602. The spacer 700 can be formed of an elastic, deformable material. Alternatively, the spacer 700 can be formed of a plastic, rubber, aluminum, steel, or other material known to the skilled artisan. The spacer 700 can be fixedly coupled to the swing frame 612 or removably coupled thereto. The spacer 700 can advantageously increase the clearance between the swing frame 612 and boom 602, as shown in FIG. 7, so that the upwardly disposed hook 606 of the boom 602 can engage with the boom lock 702. For example, the spacer 700 can increase the clearance (e.g., define a space) between the swing frame 612 and rubber body 620 by approximately 100 mm. Spacers can have other thicknesses, however, which can differ from 100 mm. In the embodiment in which there are two or more rubber bodies 620 coupled to the boom, there can also be two or more spacers 700 removably or fixedly coupled to the swing frame 612.

In one embodiment, the spacer 700 can be removably coupled to the swing frame 612. In this embodiment, the spacer 700 is coupled to the swing frame 612 in the transport position (e.g., FIG. 7) but removed therefrom in an operating condition. The spacer 700 is disposed at an angle, as shown in FIG. 7, to restrict or limit the movement of the boom 602 in a counterclockwise direction (e.g., into the transport position). The spacer 700 is advantageously aligned with the rubber body 620 to facilitate this limited movement of the boom 602.

In one aspect, the spacer 700 can be fixedly or removably coupled to the swing frame 612 when the elongated boom lock 504 includes the counterweight body 520 (see FIGS. 5 and 6). In a different aspect, the spacer 700 is fixedly coupled to the swing frame 612 when the elongated boom lock 702 does not include the counterweight body. As previously described, the counterweight body 520 of the elongated boom lock 504 can advantageously shift or move the center of gravity of the boom lock 504 near the pivot axis X-X as defined by the pivot rod 512. This reduces the overall force and effort required to actuate the boom lock 504 and control the boom 602 into the transport position.

Figure 8:
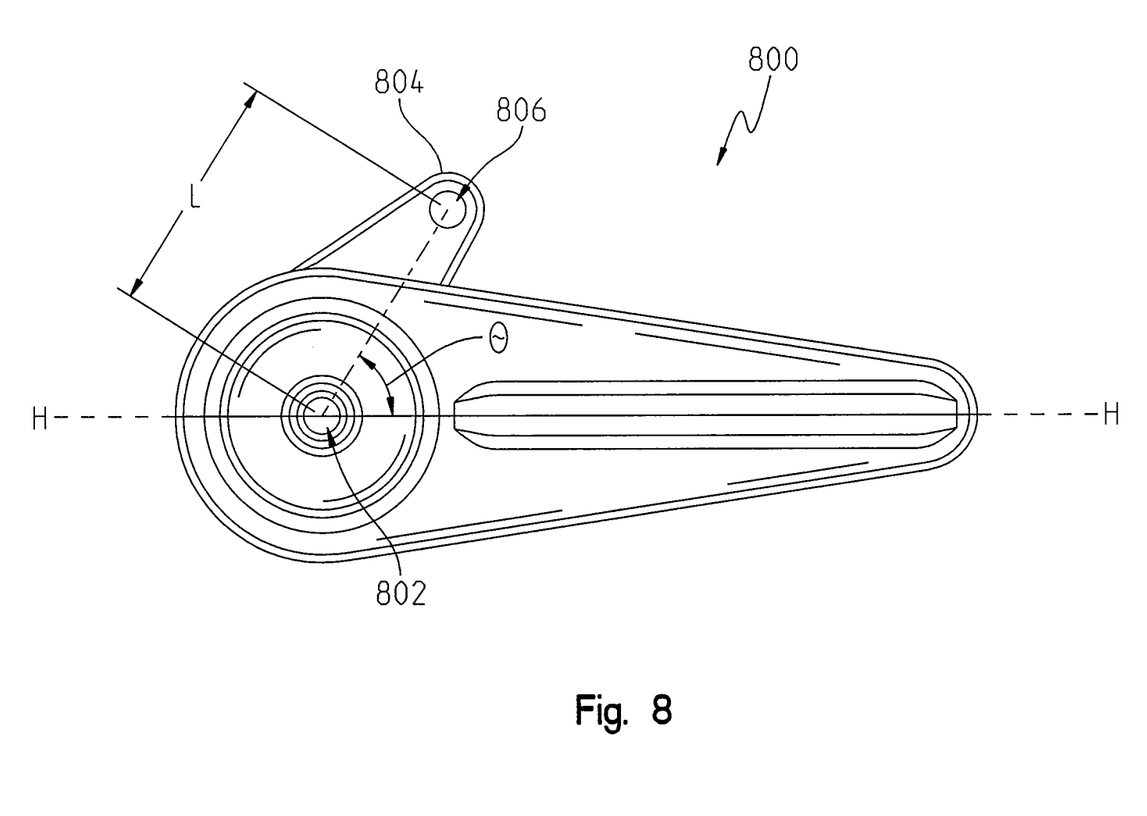
FIG. 8 is a side view of the boom lock of FIG. 7.

Referring to FIG. 8, a different aspect of the boom lock is shown. In this aspect, a boom lock 800 is shown having a flange 804 which defines an opening 806 for coupling to the linkage assembly 506 of FIG. 5. The boom lock 800 further includes a pivot opening 802 through which the boom lock 800 couples to the swing frame via the pivot rod. This pivot opening 802 defines a pivot axis, which is similarly shown as axis X-X in FIG. 5. The boom lock 800 does not include a counterweight portion and therefore the center of gravity of the boom lock 800 is spaced from the pivot axis. As previously described, when the center of gravity is shifted away from the pivot axis, the force or effort required to control the boom lock can increase. To overcome this increased force, the flange 804 of the boom lock 800 can be repositioned by an angle θ with respect to a horizontal axis H-H, which as shown in FIG. 8 is disposed perpendicular to the pivot axis (which goes into the page). In particular, the flange 804 can be repositioned in a clockwise direction such that the angle θ is reduced compared to the previously described boom locks having a counterweight body. In a non-limiting embodiment, for example, the flange 804 can be disposed at an angle of less than 70°, and in a more preferable embodiment, the angle is less than 60°. For instance, in one aspect the flange 804 can be disposed at about 58°, whereas in conventional boom locks the flange is disposed at an angle θ greater than 75°. The angles given for the boom lock 800 are not intended to be limiting as there may be advantages to having a flange disposed at an angle less than 55°.

In addition, the distance between the centers of the pivot opening 802 and flange opening 806 is increased to facilitate the reduced angular position of the flange 804. In the boom lock 400 of FIG. 4 in which the counterweight body 406 is included, the distance L between the centers of the pivot opening 418 and flange opening 414 is less than 80 mm, and preferably less than approximately 75 mm. In the boom lock 800 of FIG. 8 with the reduced angular positioned flange 804, the distance L is greater than 90 mm, and preferably about 92 mm or more. Thus, the reduced angle θ and increased distance L of the boom lock 800 can further reduce the force required to actuate the boom lock 800 and improve operator comfort inside the cab of the vehicle.

In the embodiment of FIG. 8, it can also be desirable to have a fixedly coupled spacer 700 so that sufficient clearance is provided between the flange 804 and boom as the boom rotates in a counterclockwise direction towards the swing frame. With the flange 804 being disposed at a reduced angle, e.g., 60° or less as shown in FIG. 8, and the spacer being removed in a working condition, the flange 804 is more susceptible of contacting the boom when the boom lock 800 is disposed downwardly (e.g., see FIG. 6 illustrating this position) and the boom is rotated counterclockwise towards the swing frame. This interference is problematic because the rubber body engages the swing frame, rather than the spacer (which is either removed or absent altogether), and thus as the boom rotates towards the swing frame the flange 804 can contact the upwardly extending hook of the boom before the transverse member of the boom lock can engage with the open hook of the boom. Thus, the spacer 700 advantageously adds clearance to allow the boom lock to engage the boom without the flange 804 causing any interference. In this manner, it is advantageous to provide a fixedly coupled spacer 700 to the swing frame when the boom lock 800 includes a repositioned or reduced angled flange 804, and not a counterweight body. As previously described, the boom lock 400 including the counterweight body 406 can operate with either a removable or fixedly coupled spacer since the flange 412 is disposed at an angle in which there is no interference between the open hook of the boom and flange 412.

One advantage of the counterweighted boom lock 400 over the reduced angled boom lock 800 is the degree of rotation of which the boom can achieve when the spacer is removed. Since the spacer 700 can be removable in a working condition with the counterweighted boom lock 400, the boom can achieve full rotation without the interference issue described above regarding the reduced angled flange 804. When the spacer 700 is affixed, either permanently or not, the boom cannot achieve its full degree of rotation because the rubber body 620 engages the spacer 700 to define sufficient clearance between the boom and boom lock.

It is further worth noting that a boom lock will generally not include both a reduced angled flange 804 and a counterweight body. The counterweight body and reduced angled flange both reduce the force or effort required to lock the boom to the boom lock, but the combination of both features is not required to reduce this force. However, there may be other advantages achieved by combining both features and therefore it is possible to have a boom lock including both the counterweight body and reduced angled flange.

Other alternative aspects of an elongated boom lock 300 that reduces the transport height of the boom in the transport position is to reduce the amount of material of the side members 302. In addition, the position of the flange 304 can be adjusted clockwise or counterclockwise with respect to the pivot axis (defined through opening 310 of FIG. 3). If the flange 304 is shifted counterclockwise, the force or effort required to actuate the boom lock 300 can be increased. If, however, the position of the flange 304 is adjusted clockwise the flange 304 may interfere with the boom and prevent the boom lock 300 from engaging with the upwardly extending hook of the boom. The disadvantages or limitations of these alternative embodiments, however, can be overcome by including the counterweight body and/or spacer, as described above.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A backhoe boom lock for engaging a hook member of a boom in a transport position, comprising:

a pair of side members disposed parallel to one another along a substantially horizontal axis, each side member having a first end and a second end;

a transverse member coupled between the first ends of the pair of side members, the transverse member configured to engage the hook member in the transport position;

a pivot point defined near the second end of the pair of side members, the pair of side members being pivotally coupled with respect to the pivot point such that the boom lock pivots about the pivot point;

a flange disposed between the second ends of the pair of side members, the flange disposed outwardly from the pivot point at an angle with respect to the horizontal axis; and a counterweight body integrally coupled to the second ends of the pair of side members, the center of gravity for the counterweight body being on the opposite side of the pivot point as the center of gravity for the pair of side members and the transverse member, the counterweight body moving the center of gravity for the boom lock closer to the pivot point and reducing the force required for manipulating the boom lock to engage and disengage the hook member.

2. The boom lock of claim 1, wherein the counterweight body is angularly disposed at least 90° from the flange and transverse member about the pivot point.

3. A vehicle having a frame, a ground engaging assembly mounted to the frame for supporting and propelling the vehicle along a surface, a cab coupled to the frame, a backhoe, and a swing frame pivotally mounting the backhoe on the frame about a vertical pivot, the backhoe having a boom rotatably mounted on the swing frame about a horizontal pivot for movement between a transport position and selected working positions, and a hydraulic cylinder operative between the boom and the swing frame for positioning the boom, and a locking system for selectively locking the boom to the swing frame to prevent the boom from rotating about the horizontal pivot in the transport position, comprising:

an upwardly extending hook mounted on the boom;

a control lever disposed in the cab;

a linkage assembly operably coupled to the control lever, wherein movement of the control lever actuates the linkage assembly;

a boom lock pivotally mounted on the swing frame about a pivot axis, the boom lock including a pair of elongated side members, a flange extending outwardly from the pivot axis and coupling to the linkage assembly, and a transverse member disposed between the pair of side members such that actuation of the linkage assembly lifts the transverse member to engage the upwardly extending hook in the transport position;

a counterweight body integrally coupled to the boom lock, the center of gravity for the counterweight body being on the opposite side of the pivot axis as the center of gravity for the pair of side members and the transverse member, the counterweight body moving the center of gravity for the boom lock closer to the pivot axis and reducing the force required for lifting the transverse member to engage and disengage the upwardly extending hook on the boom;

wherein, in the transport position, the distance between the uppermost point of the backhoe and the surface is less than four meters.

4. The vehicle of claim 3, wherein the counterweight body is disposed at one end of the boom lock and the transverse member is disposed at a substantially opposite end thereof.

5. The vehicle of claim 3, further comprising a spring disposed between the cab and linkage assembly for biasing the boom lock downwardly.

6. The vehicle of claim 3, further comprising a rubber body coupled to the boom, the rubber body configured to contact the swing frame in the transport position.

7. The vehicle of claim 6, further comprising a spacer coupled to the swing frame and aligned to contact the rubber body in the transport position, the spacer having a defined thickness to permit the engagement of the transverse member and upwardly extending hook.

8. The vehicle of claim 7, wherein the spacer is removably or fixedly coupled to the swing frame.

9. The vehicle of claim 8, wherein the counterweight body is integrally formed at one end of the boom lock.

10. The vehicle of claim 3, wherein:

the pair of elongated side members are disposed parallel to one another along a horizontal axis, the horizontal axis being planar but perpendicular to the pivot axis; and the flange is angularly disposed with respect to the horizontal axis at less than 60°.

11. The vehicle of claim 3, further comprising a pivot rod disposed along the pivot axis, the boom lock being pivotally mounted to the swing frame about the pivot rod.

12. A work vehicle for performing an operation, comprising:

a frame;

a ground engaging assembly mounted to the frame for supporting and propelling the vehicle along a surface;

an operator's cab mounted to the frame;

a swing frame pivotally mounted to the frame about a vertical pivot;

a backhoe having a boom and a hydraulic cylinder, the boom being rotatably mounted on the swing frame about a horizontal pivot for movement between a transport position and selected working positions, and the hydraulic cylinder operative between the boom and the swing frame for positioning the boom, and a locking system for selectively locking the boom to the swing frame to prevent the boom from rotating about the horizontal pivot in the transport position, the locking system comprising:

an open hook mounted on the boom;

a control lever disposed in the cab;

linkage assembly operably coupled to the control lever;

a spring assembly coupled at one end to the operator's cab and at an opposite end to the linkage assembly;

a boom lock pivotally mounted on the swing frame about a pivot axis, the boom lock including a pair of elongated side members, a flange extending outwardly from the pivot axis and coupling to the linkage assembly, and a transverse member disposed between the pair of side members such that actuation of the control lever lifts the transverse member to engage the open hook in the transport position; and a counterweight body integrally coupled to the boom lock, the center of gravity for the counterweight body being on the opposite side of the pivot axis as the center of gravity for the pair of side members and the transverse member, the counterweight body moving the center of gravity for the boom lock closer to the pivot axis and reducing the force required for lifting the transverse member to engage and disengage the open hook;

wherein, the boom is configured to move between the selected working positions and the transport position, such that in the selected working positions the spring assembly biases the transverse member downwardly;

further wherein, in the transport position, the distance between an uppermost point of the backhoe and the surface is less than four meters.

13. The vehicle of claim 12, further comprising:

at least one spacer fixedly or removably coupled to the swing frame; and at least one rubber body coupled to the boom;

wherein, in the transport position, the at least one spacer and at least one rubber body are in contact with one another.

14. The vehicle of claim 13, wherein the at least one spacer is removed from the swing frame in any one of the selected working position.

15. The vehicle of claim 12, wherein:

the pair of elongated side members are disposed parallel to one another along a horizontal axis, the horizontal axis being substantially planar but perpendicular to the pivot axis; and the flange is angularly disposed with respect to the horizontal axis at greater than 70°.

16. The vehicle of claim 12, further comprising:

a spacer fixedly coupled to the swing frame; and a rubber body coupled to the boom, such that in the transport position the spacer and rubber body are in contact with one another;

wherein, the spacer has a thickness which defines a space between the swing frame and boom through which the transverse member can move to engage with the open hook.

17. The vehicle of claim 16, wherein:

the pair of elongated side members are disposed parallel to one another along a horizontal axis, the horizontal axis being planar but perpendicular to the pivot axis; and the flange is angularly disposed with respect to the horizontal axis at less than 60°.

18. The vehicle of claim 12, wherein actuation of the control lever to selectively engage the transverse member and open hook requires a force exerted on the control lever of about 111 N or less.

* * * * *